June 9, 1931.  A. GUIOT  1,809,514
MOTOR FUEL PUMP
Filed April 3, 1930
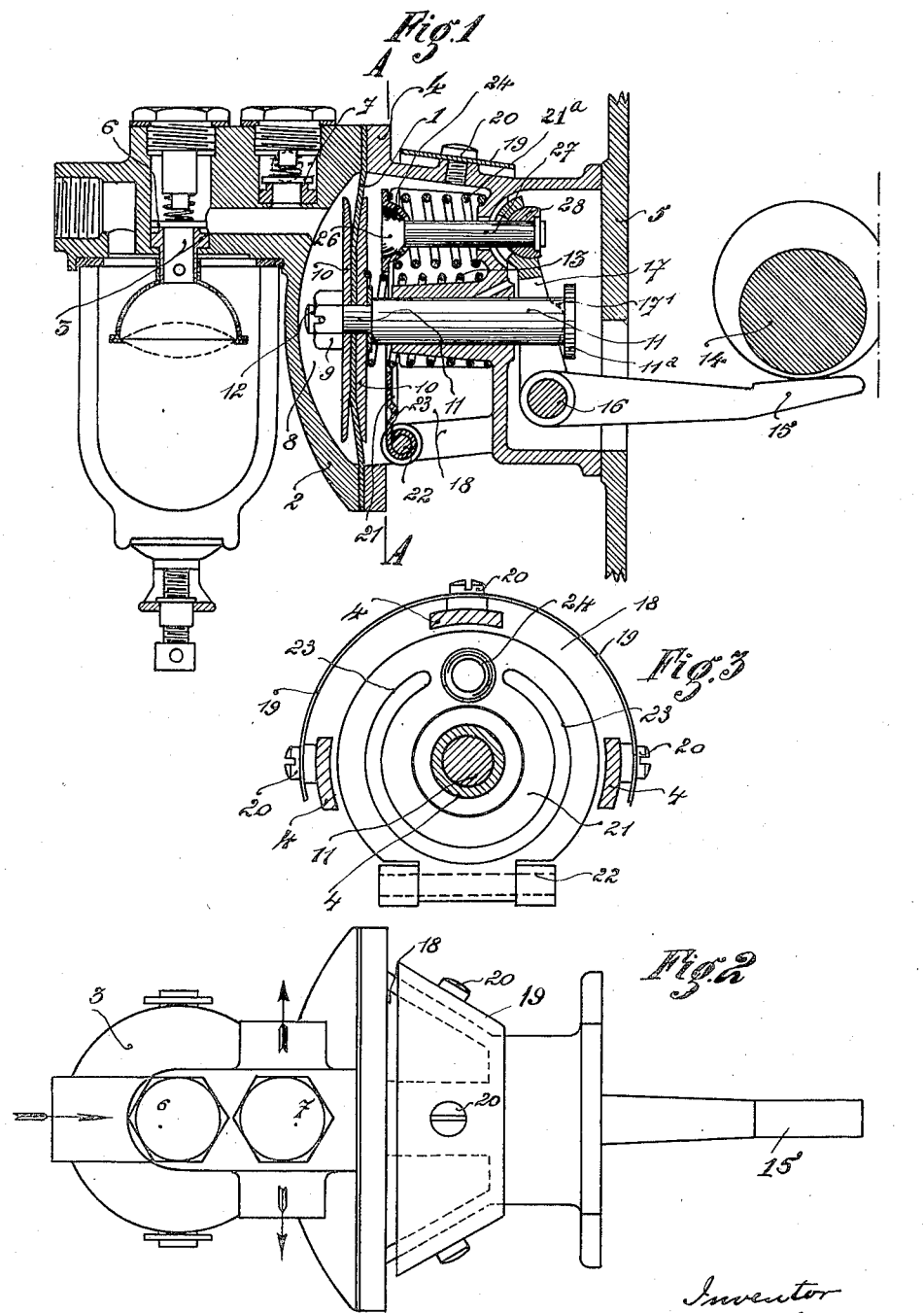
Inventor
Auguste Guiot
by Henry Orth Jr
Atty Patented June 9, 1931

1,809,514

UNITED STATES PATENT OFFICE

AUGUSTE GUIOT, OF NEUILLY-SUR-SEINE, FRANCE

MOTOR FUEL PUMP

Application filed April 3, 1930, Serial No. 441,321, and in France April 8, 1929.

The pumps used for feeding the motors of motor vehicles are generally placed in the vicinity of the motor which operates them and owing to this fact they run the risk of being overheated. This is more particularly the case with pumps which are provided with a diaphragm, the heating being such that it causes the production of fuel vapors which acquire a certain pressure and may even stop the movements of the diaphragm.

My invention relates to an improvement which remedies this inconvenience in that it provides for the continuous cooling of the diaphragm.

To this end, my invention consists in placing at the rear of the diaphragm or membrane a pulsating shutter which may be advantageously combined with the diaphragm driving mechanism, and with a cage having appropriate apertures to allow continuously fresh air to come into contact with the diaphragm.

The cage is also surrounded with a trellis frame or a suitably arranged water jacket designed to prevent the passage of the coarse particles of dust drawn in by the ventilating air.

The appended drawings show by way of example a mode of construction of an improved motor fuel pump provided with a diaphragm according to my invention.

Fig. 1 is a longitudinal sectional view of same,

Fig. 2 is a plan view and Fig. 3 is a sectional view on line A—A, Fig. 1.

As will be seen according to the present mode of construction, the diaphragm or membrane 1 of the pump is clamped circumferentially between the support 2 of the filter 3 and the cage frame 4 which is secured in any suitable manner upon the motor casing. Said support 2 is provided with a suction valve 6 and a delivery valve 7, and it is provided also with a recess 8 for the retaining nut 9 of the plates 10 which clamp the diaphragm in its middle portion. The nut 9 is locked upon the screwthreaded end 12 of the shaft 11 of the diaphragm which shaft slides in a bearing 12ª in the supporting cage 4.

In this case the diaphragm is actuated mechanically by the motor in the direction of the suction and by means of a return spring 13 in the direction of the exhaust.

The suction stroke is controlled by means of a cam 14 bearing continuously against one arm 15 of a two-arm lever pivoted at 16. The other arm 17 of the lever is conveniently shaped so as to ride upon the shaft 11 and it is provided with bosses $17^1$ which act upon a head $11^a$ at the rear end of said shaft.

The cage 4 constructed according to my invention is provided with openings 18 some of which, the upper ones for example, are protected for a certain distance by a jacket 19 secured by means of bolts 20 in such a manner as to allow the movements of the air but to prevent the passage of the coarse dust particles. A transverse shutter 21 pivoted upon a shaft 22 is placed inside said cage. It may be constituted for example by a small sheet metal plate circular in shape and made rigid by means of a pressed-in rib 23. The plate which is recessed in the middle is also provided with a pressed-in semi-spherical recess 24 constituting a cradle for a spherical bearing 26 formed at the end of a connecting rod 27 which connects the shutter with the lever 17. The connecting rod which passes through both the plate and the lever is provided at its other end with a second ball 28 bearing in a suitable socket in the end of lever 17 and is surrounded by a spring $21^a$ abutting at one end against the cage and at the other end against the shutter.

It will be evident that every time the diaphragm accomplishes its suction stroke the shutter 21 will oscillate in the same direction. When it moves in the opposite direction as it effects its delivery stroke under the action of spring 13, the shutter will oscillate in the opposite direction and so on. Consequently as the shutter operates synchronously with the diaphragm the latter will be continuously ventilated and effectually cooled, the air being continuously renewed through the openings 18.

What I claim and desire to secure by Letters Patent of the United States is:

1. A motor fuel pump for feeding motors, which comprises an operating chamber, suction and delivery valves opening into said chamber, a pliable diaphragm obturating said chamber, a cage supporting the chamber, means operated by the motor to cause alternating movement of said diaphragm, a ventilating shutter placed at the rear of the diaphragm and outside the operating chamber in said cage freely open to the atmosphere and also driven by the motor operated means to actuate said shutter.

2. A motor fuel pump for feeding motors, which comprises an operating chamber, suction and delivery valves opening into said chamber, a pliable diaphragm obturating same, a cage supporting the chamber, means driven by the motor to cause alternating movement of said diaphragm, a pivoted ventilating shutter arranged at the rear of said diaphragm and outside the operating chamber in said cage freely open to the atmosphere, said means also operating said shutter to move synchronously with the diaphragm.

3. A motor fuel pump, which comprises an operating chamber, suction and delivery valves opening into same, a pliable diaphragm obturating said chamber, a supporting cage, a pivoted ventilating shutter placed at the rear of said diaphragm outside the operating chamber in said cage open to the atmosphere, and means driven by the motor for simultaneously actuating the diaphragm and the ventilating shutter.

4. A motor fuel pump for feeding motors, which comprises an operating chamber, suction and delivery valves opening into said chamber, a pliable diaphragm obturating said chamber, an apertured cage supporting the chamber, a pivoted, ventilating shutter arranged at the rear of said diaphragm outside the operating chamber in said cage, means driven by the motor to synchronously actuate the diaphragm and the ventilating shutter, and a casing surrounding the cage and spaced from the cage to prevent the passage of dust but allow the circulation of air.

In testimony that I claim the foregoing as my invention I have signed my name.

AUGUSTE GUIOT.